(12) United States Patent
Kibayashi

(10) Patent No.: US 6,382,823 B1
(45) Date of Patent: May 7, 2002

(54) VEHICULAR HEADLAMP HAVING REDUCED CASE FORMATION

(75) Inventor: Michinobu Kibayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 34 days.

(21) Appl. No.: 09/691,212

(22) Filed: Oct. 19, 2000

(30) Foreign Application Priority Data

Oct. 19, 1999 (JP) ............................................. 11-297127

(51) Int. Cl.[7] ............................................. B60Q 1/100
(52) U.S. Cl. ..................... 362/548; 362/265; 362/546; 362/401; 315/82
(58) Field of Search ................................. 362/263, 265, 362/548, 546, 401; 315/82

(56) References Cited

U.S. PATENT DOCUMENTS

| | | | |
|---|---|---|---|
| 5,124,895 A | 6/1992 | Segoshi et al. | 362/265 |
| 5,237,489 A | 8/1993 | Stein et al. | 362/61 |
| 5,700,079 A | 12/1997 | Woerner et al. | 362/80 |
| 5,838,109 A | * 11/1998 | Kobayashi et al. | 315/58 |
| 5,895,113 A | 4/1999 | Ozaki et al. | 362/546 |
| 5,941,633 A | 8/1999 | Saito et al. | 362/543 |
| 6,008,584 A | * 12/1999 | Koaira et al. | 315/82 |
| 6,161,951 A | * 12/2000 | Yoneyama et al. | 362/516 |

FOREIGN PATENT DOCUMENTS

GB  2 297 148 A  7/1996  ............ B60Q/1/04

* cited by examiner

Primary Examiner—Sandra O'Shea
Assistant Examiner—Ali Alvai
(74) Attorney, Agent, or Firm—Sughrue Mion, PLLC (57) ABSTRACT

A vehicular headlamp of a type having a lighting circuit unit mounted on an outer surface of a bottom wall of the lamp body in which failure of the seal between the lamp body and a front lens mounted thereon is prevented. A bottom wall extension portion is formed at a rear end portion of a bottom wall of the lamp body, extending rearward beyond a bulb replacement opening formed in a rear wall of the lamp body. This structure provides sufficient rigidity for the rear end portion of the bottom wall, which otherwise would have insufficient rigidity because of its location adjacent the bulb replace opening. Therefore, the bottom wall is protected from deflection deformation due to the weight of the lighting circuit unit. As a result, the front end opening of the lamp body is protected from deformation.

10 Claims, 6 Drawing Sheets

FIG. 6
PRIOR ART

# VEHICULAR HEADLAMP HAVING REDUCED CASE FORMATION

FIELD OF THE INVENTION

The present invention relates to a vehicular headlamp having a discharge bulb as its light source.

BACKGROUND OF THE INVENTION

There has been a recent trend in vehicular headlamps toward adopting discharge bulbs that can emit light of high intensity as the light source bulb.

Figure 6:
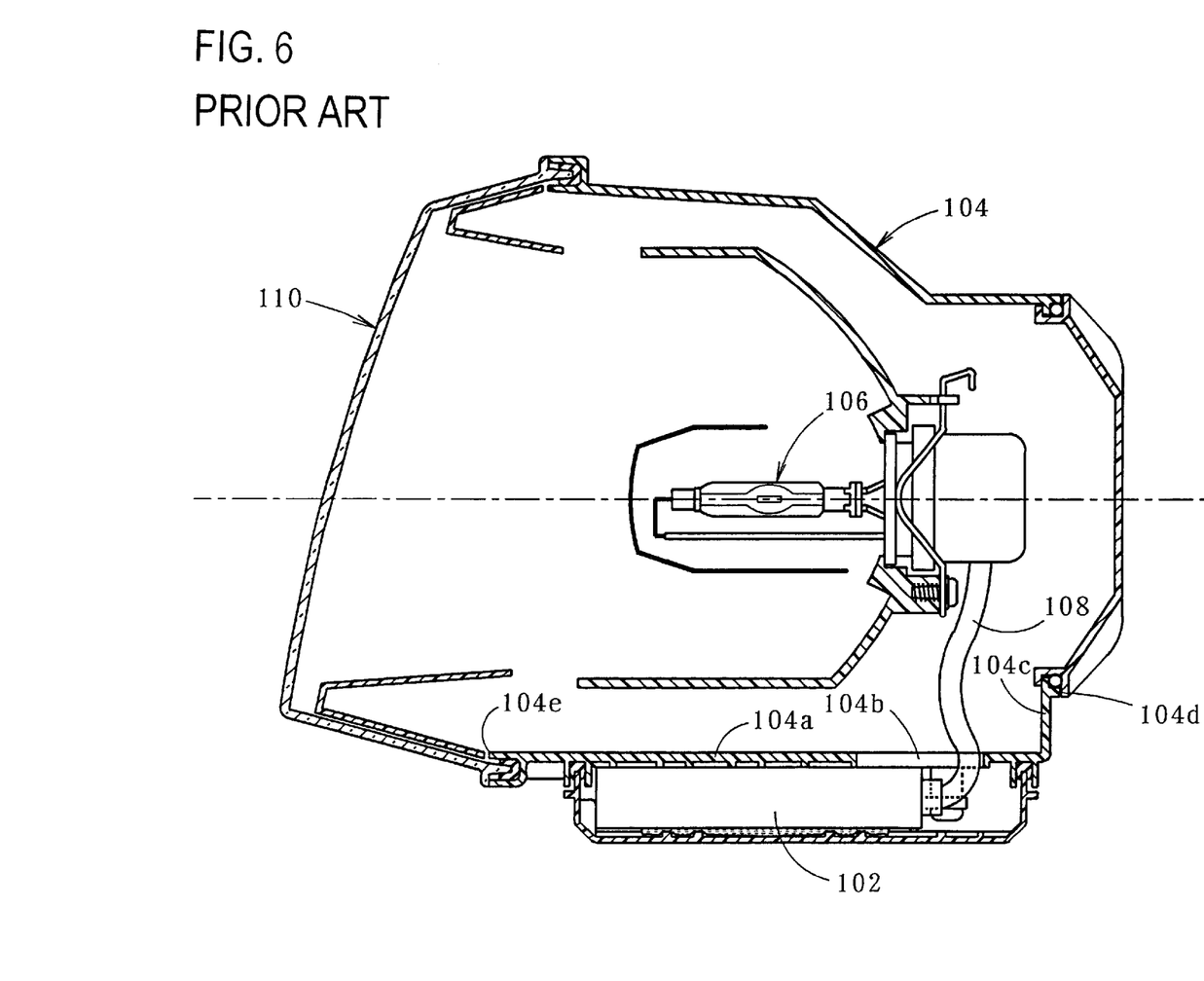
FIG. 6 is a view similar to FIG. 2 but showing a conventional vehicular headlamp.

A vehicular headlamp equipped with a discharge bulb of this type requires a lighting circuit unit to ignite the discharge bulb. Referring to FIG. 6, a lighting circuit unit 102 is in many cases mounted on an outer surface of a bottom wall 104a of a lamp body 104.

Because of a relatively heavy weight associated with the lighting circuit unit 102, deflection deformation tends to occur in the bottom wall 104a of the lamp body 104 when the lighting circuit unit 102 is mounted on the outer surface of the bottom wall 104a. Moreover, a cord insertion opening 104b, used for passing a power feeding cord 108 connecting the lighting circuit unit 102 to a discharge bulb 106, is formed in the bottom wall 104a. A bulb replacement opening 104d for allowing replacement of the discharge bulb 106 is formed in a rear wall 104c of the lamp body 104. These arrangements result in insufficient rigidity in the rear end portion of the bottom wall 104a. This may also result in deflection deformation of the bottom wall 104a due to the weight of the lighting circuit unit 102.

Deflection deformation in the bottom wall 104a can also eventually result in deformation in a front end opening 104e of the lamp body 104, thus leading to failure in the seal between the lamp body 104 and a front lens 110.

SUMMARY OF THE INVENTION

In view of the foregoing situation, it is an object of the present invention to provide a vehicular headlamp in which a lighting circuit unit is mounted on the outer surface of a bottom wall of a lamp body and yet which does not induce failure in the seal between the lamp body and front lens.

The present invention achieves the above object by forming a bottom wall extension portion in a bottom wall of a lamp body.

More specifically, a vehicular headlamp of the present invention includes a reflector supporting a discharge bulb housed in a lamp chamber defined by a lamp body, a front lens fitted in an opening at a front end of the lamp body, and a lighting circuit unit for igniting the discharge bulb installed on an outer surface of a bottom wall of the lamp body, and in which a bulb replacement opening for replacing the discharge bulb is formed in a rear wall of the lamp body, and a cord insertion opening, through which a power feeding cord connecting the lighting circuit unit to the discharge bulb passes, is formed in the bottom wall of the lamp body. The vehicular headlamp of the invention is characterized in that a bottom wall extension portion extending rearward beyond the bulb replacement opening is formed at a rear end portion of the bottom wall of the lamp body.

The lighting circuit unit may be constructed so as to be mounted directly, or indirectly via a bracket, unit cover, or other means, on the outer surface of the bottom wall.

The shape of the bottom wall extension portion is not limited so long as it extends rearward beyond the bulb replacement opening.

As described above, the vehicular headlamp according to the present invention has, at the rear end portion of the bottom wall thereof, a bottom wall extension portion which extends rearward beyond the bulb replacement opening, even though the bulb replacement opening is formed in the rear wall of the lamp body and the lighting circuit unit is mounted on the outer surface of the bottom wall of the lamp body, thus providing operational effects as discussed in detail below.

Namely, sufficient rigidity cannot be obtained from the rear end portion of the bottom wall of the lamp body alone since it is adjacent to the bulb replacement opening formed in the rear wall of the lamp body. By providing the bottom wall extension portion according to the present invention it becomes possible to obtain sufficient rigidity for the rear end portion of the bottom wall. This prevents the bottom wall from developing deflection deformation due to the weight of the lighting circuit unit, which in turn prevents deformation of the front end opening in the lamp body. Accordingly, failure of the seal between the lamp body and the front lens is prevented.

Forming the bottom wall extension portion on the bottom wall of the lamp body results in an area of the outer surface of the bottom wall extending rearward. This allows the lighting circuit unit to be mounted at a position further rearward on the outer surface of the bottom wall than would otherwise be possible. This arrangement of the lighting circuit unit permits the mounting of the lighting circuit unit on the bottom wall so that it crosses the rear wall, which prevents deflection deformation in the bottom wall due to the weight of the lighting circuit unit. Should some deflection deformation occur, the front end opening is not influenced by such deformation, thus suppressing failure in the seal between the lamp body and the front lens.

In the vehicular headlamp of the invention equipped with a lighting circuit unit mounted on the outer surface of the bottom wall of the lamp body, failure of the seal between the lamp body and the front lens is effectively prevented.

The aforedescribed structure can further be provided with a plurality of reinforcement ribs extending rearward from the rear wall of the lamp body and which are formed on a top surface of the bottom wall extension portion. With the reinforcement ribs the rigidity of the lamp body is enhanced in the area extending from the rear wall to the bottom wall extension portion. This structure is effective to suppress deflection deformation in the bottom wall due to the weight of the lighting circuit unit. Should any deflection deformation nevertheless occur, the front end opening is not subjected to such deformation, thus preventing failure of the seal between the lamp body and the front lens further effectively.

If the bottom wall extension portion in the aforementioned structure is formed as a folded-back portion having substantially a U-shape in cross section, the rigidity of the bottom wall extension portion is enhanced. This structure is effective in reducing deflection deformation in the bottom wall due to the weight of the lighting circuit unit. Should some deflection deformation nevertheless occur, the front end opening is not subjected to such deformation, thus preventing failure of the seal between the lamp body and the front lens more effectively.

Assuming that a unit cover for covering the lighting circuit unit is mounted on the outer surface of the bottom wall of the lamp body in the aforementioned structure, and the part of the unit cover mounting sealing portion on the bottom wall, which is located rearward of the lighting circuit unit, is formed on the bottom surface of a bottom wall extension portion, which extends rearward from the rear end portion of the bottom wall. As a result, the unit cover mounting sealing portion is protected from deformation, which in turn contributes to obtaining and maintaining a good seal between the unit cover and lamp body.

In this case, the unit cover may be installed separately from the lighting circuit unit mounted on the outer surface of the bottom wall. It may be installed together with the lighting circuit unit on the outer surface of the bottom wall. It may also be assembled with the lighting circuit unit preliminarily so as to be mounted on the outer surface of the bottom wall.

DESCRIPTION OF THE PREFERRED EMBODIMENTS

Preferred embodiments of the present invention will now be described referring to the drawings.

Figure 1:
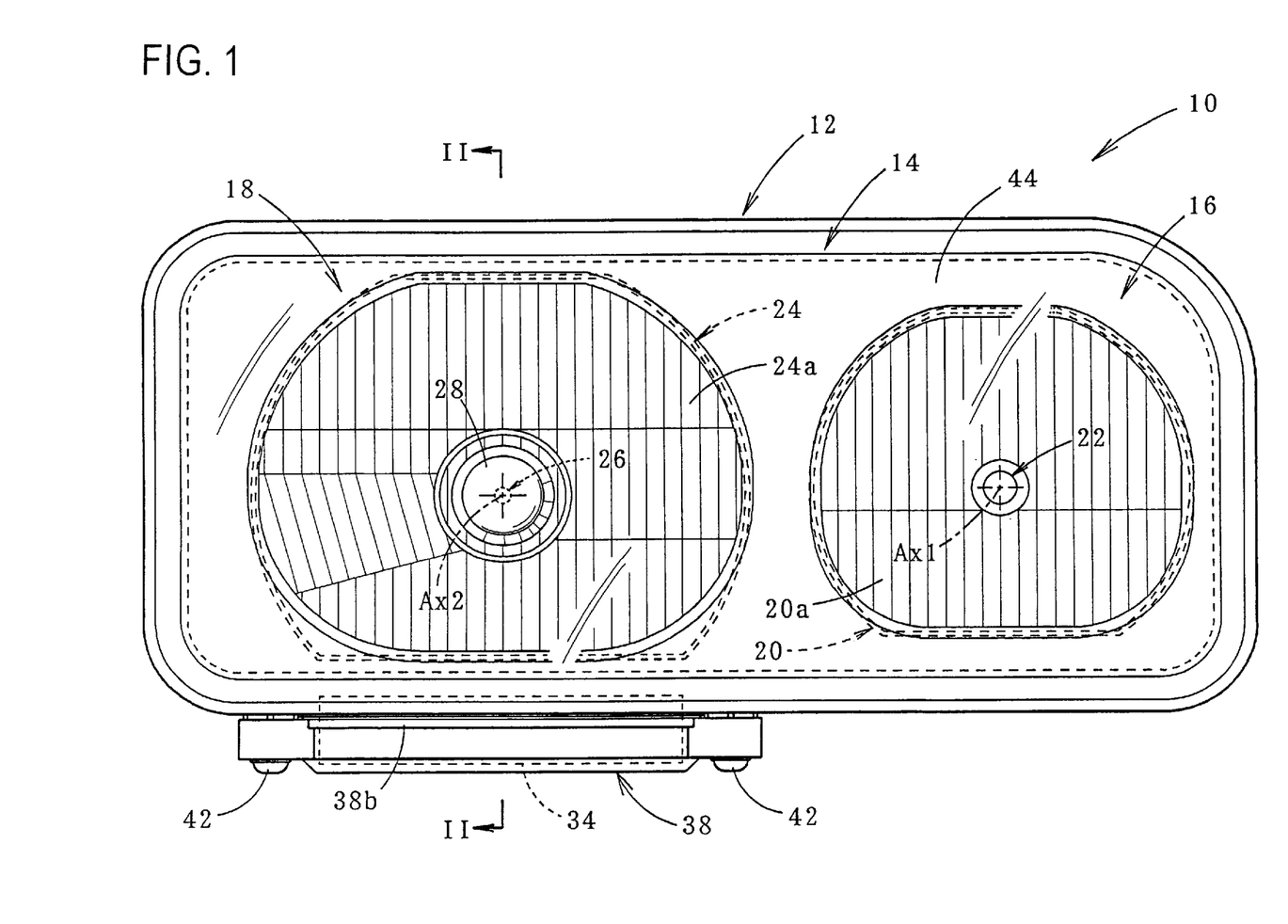
FIG. 1 is a front view showing a vehicular headlamp according to a preferred embodiment of the present invention.
Figure 2:
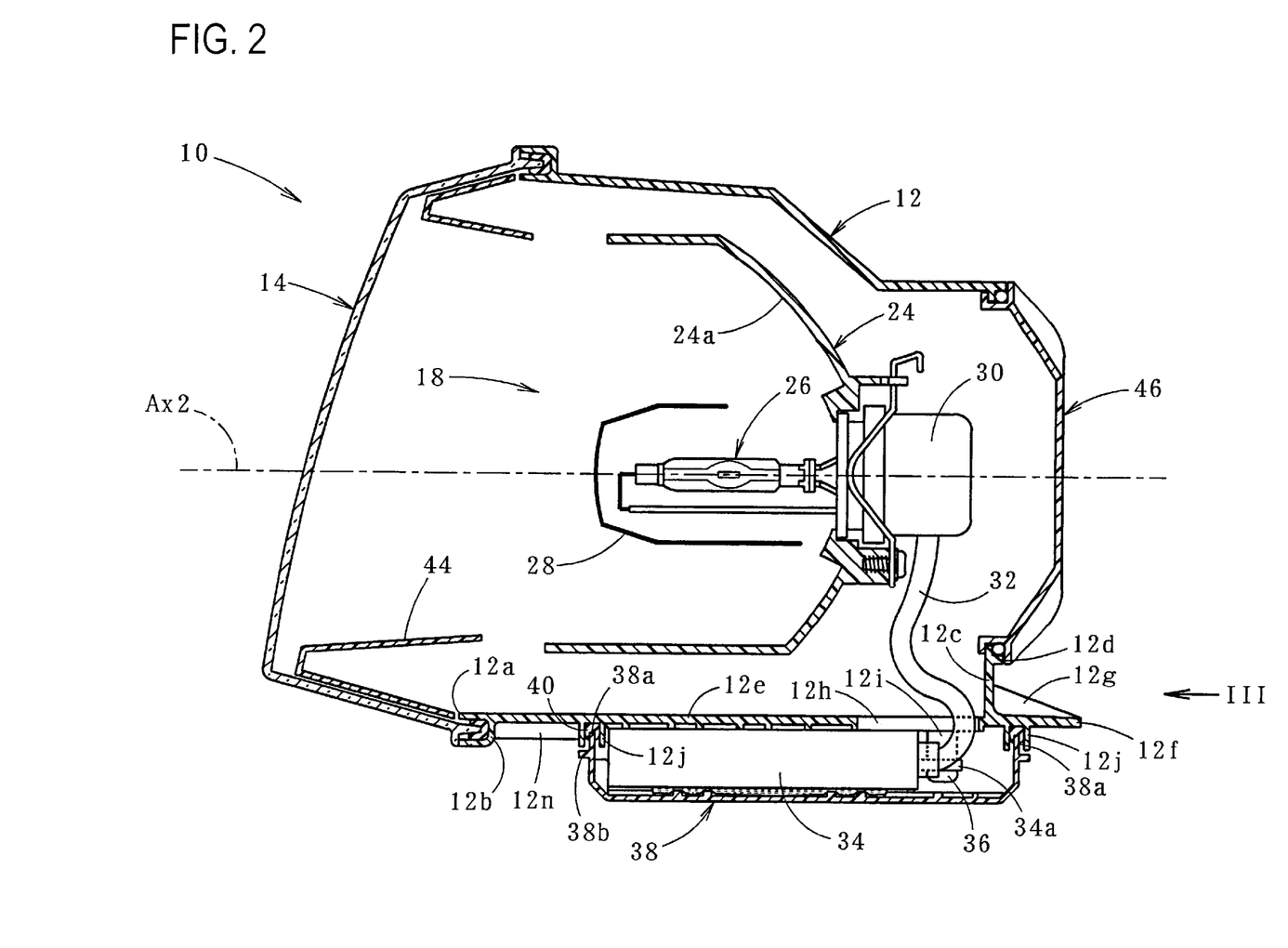
FIG. 2 is a cross-sectional view taken along a line II—II in FIG. 1.
Figure 3:
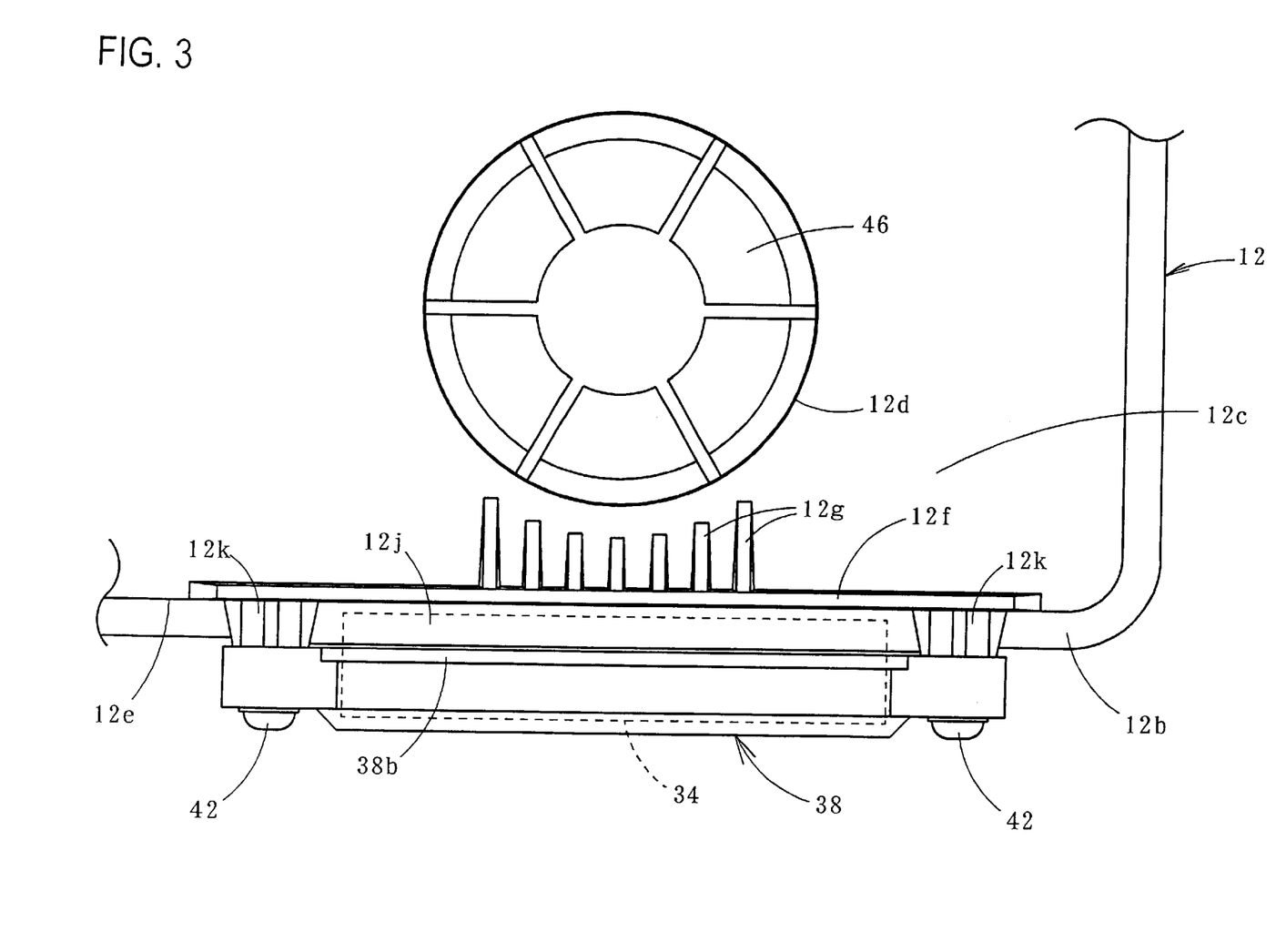
FIG. 3 is a perspective view in a direction III indicated in FIG. 2.

FIG. 1 is a front view showing the vehicular headlamp according to a first embodiment of the present invention. FIG. 2 is a cross-sectional view taken along line II—II in FIG. 1. FIG. 3 is a perspective view in the direction of an arrow III shown in FIG. 2.

As shown in these drawings, a vehicular headlamp 10 according to the present embodiment is a four-lamp system in which a pair of left and right reflector units 16, 18 is housed in a lamp chamber defined by a lamp body 12 and a front lens 14 fitted in an opening 12a at a front end of the lamp body 12, and the reflector units are mounted in such a manner that they can be adjustably tilted in vertical and horizontal directions by respective aiming mechanisms (not shown in the drawings). An extension panel 44 is provided forward of the two reflector units 16, 18.

The front lens 14 is a transparent lens, and thus the two reflector units 16, 18 provide the light distribution control function for the headlamp.

The reflector unit 16, which is used for the main (high) beam, is formed of a reflector 20 having a reflecting surface 20a on which a plurality of reflecting elements are formed and a halogen bulb 22 mounted on the optical axis Ax1 of the reflector 20. By incorporating the diffusion or deflection function into the reflector 20 it is ensured that the output beam will form the desired main beam light distribution pattern in the forward direction.

The reflector unit 18 is used for the sub (low) beam. It is formed of a reflector 24 having a reflecting surface 24a on which a plurality of reflecting elements are formed, a discharge bulb 26 mounted on the optical axis Ax2 of the reflector 24, and a shade 28 fitted on the reflector 24 so as to cover the discharge bulb 26 over a predetermined angular range. As in the previously described case, by incorporating the diffusion or deflection function into the reflector 20 it is ensured that the output beam will form the desired main beam light distribution pattern in the forward direction.

A lens sealing groove 12b for mounting the front lens 14 is formed around the entire circumference of the front end opening 12a of the lamp body 12. A bulb replacement opening 12d for permitting replacement of the discharge bulb 26 is formed in a rear wall 12c located to the rear of the reflector unit 18 in the lamp body 12. A back cover 46 is fitted into the bulb replacement opening 12d.

Furthermore, a bottom wall extension portion 12f is formed at a rear end portion of a bottom wall 12e located below the reflector unit 18 in the lamp body 12, extending further rearward than the bulb replacement opening 12d. The bottom wall extension portion 12f is formed with a plate-like shape so as to directly extend the bottom wall 12e rearward. In addition, seven reinforcement ribs 12g that extend rearward from the rear wall 12c are formed on a top surface of the bottom wall extension portion 12f. The height of a base edge portion of each of these reinforcement ribs 12g is set so as to run along the circular shape of the bulb replacement opening 12d. That is, the height of the base edge portion of centrally located reinforcement ribs 12g is lower than that of the reinforcement ribs 12g located on both left and right edges.

As the discharge bulb 26 requires high voltage for ignition, it is connected to a lighting circuit unit 34 via a bulb socket 30 and a power feeding cord (high voltage cord) 32. The lighting circuit unit 34 is provided with a starting circuit and a stabilizing circuit, both housed in a lighting circuit case. The case is fitted on the outer surface on a rear end side of the bottom wall 12e of the lamp body 12. A cord insertion opening 12h, through which the power feeding cord 32 passes, is formed in the rear portion of the bottom wall 12e.

The top end surface of the lighting circuit unit 34 is abutted against the bottom wall 12e of the lamp body 12, and a tab 34a formed on the rear end surface of the lighting circuit unit 34 is abutted against a boss 12i formed on the bottom wall 12e and tightened with a screw 36. As a result, the lighting circuit unit 34 can be installed on the lamp body 12.

A unit cover 38 is mounted on the bottom wall 12e of the lamp body 12 so as to cover the lighting circuit unit 34 from below. A sealing leg portion 38a of the unit cover 38 is inserted, through the intermediary of a sealing material 40, into a sealing groove 12j (unit cover mounting sealing portion) formed in the bottom wall 12e of the lamp body 12 so as to surround the lighting circuit unit 34. Concurrently, screws 42 are tightened to secure the unit cover 38 to the lamp body 12 with respect to the bosses 12k formed to project downward from the bottom wall 12e of the lamp body 12 at a plurality of positions. Such an installation of the unit cover 38 to the lamp body 12 seals the space within the unit cover 38 in which the lighting circuit unit 34 is contained from the external space of the lamp unit. A flange portion 38b is formed on the outer peripheral surface of the unit cover 38 so that the sealing leg portion 38a is not excessively inserted into the sealing groove 12j when installing the unit cover 38 on the lamp body 12.

A portion to the rear of the lighting circuit unit 34 in the sealing groove 12j formed in the bottom wall 12e of the lamp body 12 is formed on the bottom surface of the bottom wall extension portion 12f. A coupling rib 12n that extends in a longitudinal direction is formed between a portion forward of the lighting circuit unit 34 in the sealing groove 12*j* formed in the bottom wall 12*e* of the lamp body 12 and a lens sealing groove 12*b*.

As described in detail above, in the vehicular headlamp 10 according to the present embodiment, the lighting circuit unit 34 is mounted on the outer surface of the bottom wall 12*e* of the lamp body 12, in addition to the bulb replacement opening 12*d* being formed in the rear wall 12*c* of the lamp body 12. The bottom wall extension portion 12*f* is formed at the rear end portion of the bottom wall 12*e*, extending rearward beyond the bulb replacement opening 12*d*.

With this structure, the following operational effects can be obtained.

As the rear end portion of the bottom wall 12*e* of the lamp body 12 is located adjacent the bulb replacement opening 12*d* formed in the rear wall 12*c* of the lamp body 12, sufficient rigidity cannot be obtained with the conventional structure. However, the bottom wall extension portion 12*f* provided in the present embodiment causes the rear end portion of the bottom wall 12*e* to exhibit sufficient rigidity. As a result, the bottom wall 12*e* is protected from deflection deformation due to the weight of the lighting circuit unit 34. This is also effective in preventing deformation of the front end opening 12*a* in the lamp body 12, thus preventing failure in the seal between the lamp body 12 and the front lens 14.

Moreover, formation of the bottom wall extension portion 12*f* on the bottom wall 12*e* of the lamp body 12 extends the area of the outer surface thereof rearward. This makes it possible, as in the present embodiment, to install the lighting circuit unit 34 on the outer surface of the bottom wall 12*e* at a position further rearward. Therefore, the lighting circuit unit 34 is installed on the bottom wall 12*e* so as to cross the rear wall 12*c* in the longitudinal direction. This suppresses deflection deformation in the bottom wall 12*e* due to the weight of the lighting circuit unit 34. Should any deflection deformation nonetheless occur, the front end opening 12*a* is isolated from such deformation, thus protecting the seal between the lamp body 12 and the front lens 14 from failure.

According to the vehicular headlamp of the present embodiment in which the lighting circuit unit is installed on the outer surface of the bottom wall of the lamp body, failure of the seal between the lamp body and the front lens is effectively prevented.

Particularly in an oblong-shaped four-lamp system like the vehicular headlamp 10 according to the present embodiment, without the invention the bottom wall 12*e* of the lamp body 12 is susceptible to deflection deformation due to the weight of the lighting circuit unit 34. The lens sealing groove 12*b* is also susceptible to deformation. Therefore it is particularly effective to apply the structure according to the present embodiment to such a lamp system.

In the present embodiment, a plurality of reinforcement ribs 12*g* are formed on, the top surface of the bottom wall extension portion 12*f*, each extending rearward from the rear wall 12*c* of the lamp body 12. This enhances the rigidity of the lamp body 12 for a portion from the rear wall 12*c* to the bottom wall extension portion 12*f*. This protects the bottom wall 12*e* from deflection deformation due to the weight of the lighting circuit unit 34. Should any deflection deformation occur, however, the front end opening 12*a* is not significantly affected by the deformation, thus effectively preventing failure of the seal between the lamp body 12 and the front lens 14.

In addition, in the present embodiment, the unit cover 38 that covers the lighting circuit unit 34 is mounted on the outer surface on the bottom wall 12*e* of the lamp body 12. The part of the unit cover mounting sealing groove 12*j* formed in the bottom wall 12*e* which is located to the rear of the lighting circuit unit 34 is formed on the bottom surface of the bottom wall extension portion 12*f*. That is, such part is located at a position rearward from the rear end portion of the bottom wall 12*e*. This protects the sealing groove 12*j* from deformation, which in turn contributes to maintenance of a good sealing effect between the unit cover 38 and lamp body 12.

Figure 4:
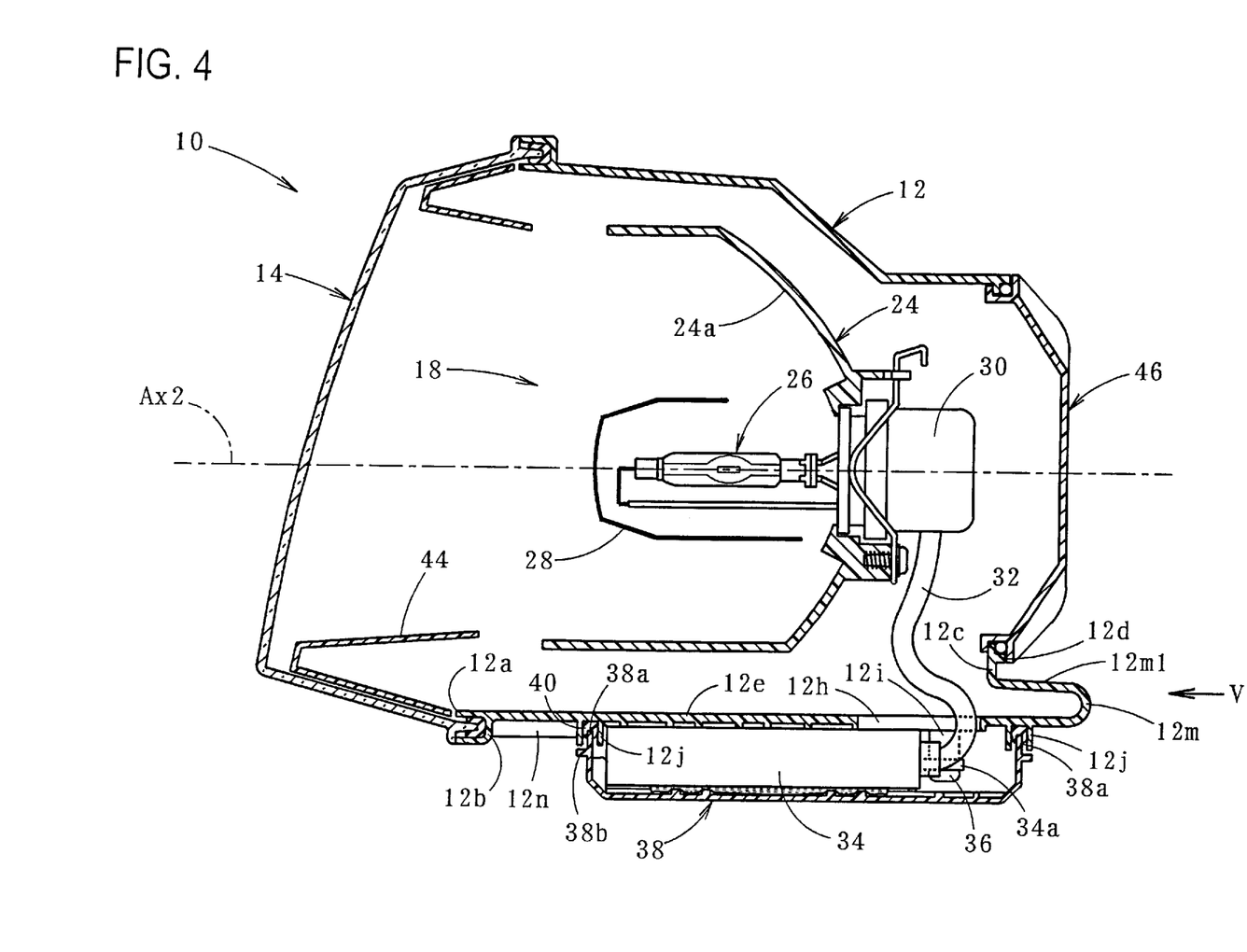
FIG. 4 is a sectional side elevational view showing a modified example of the embodiment of FIGS. 1–3.
Figure 5:
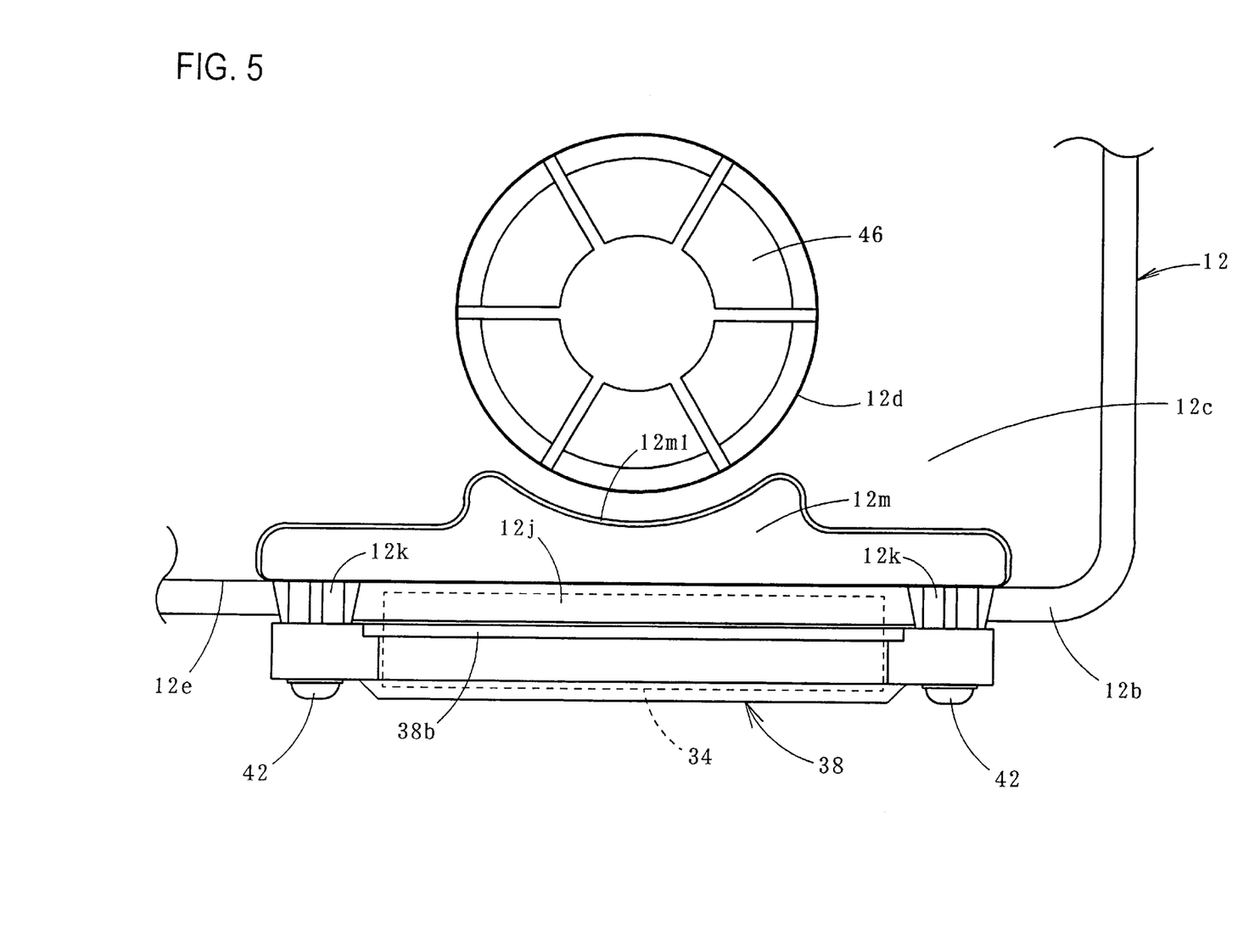
FIG. 5 is a perspective view in the direction of an arrow V in FIG. 4.

FIG. 4 is a sectional side elevational view showing a modified example of the embodiment. FIG. 5 is a perspective view in the direction of arrow V shown in FIG. 4.

In the modified example, the bottom wall extension portion 12*m* is formed at a rear end portion of the bottom wall 12*e* of the lamp body 12, extending rearward beyond the bulb replacement opening 12*d*, as shown in the drawing. The bottom wall extension portion 12*m* is not formed in a plate-like shape, but is formed as a folded-back portion having a vertical cross section which is substantially U-shaped. A top surface 12*ml* of the bottom wall extension portion 12*m* is formed in an arc along the circumference of a bulb replacement opening 12*d*. In the modified example, reinforcement ribs 12*g* as provided in the previously described embodiment are not required.

In this modified example, the provision of the bottom wall extension portion 12*m* in the form of a folded-back portion with a substantially U-shaped cross section enhances the rigidity in the bottom wall extension portion 12*m*. As a result, the bottom wall 12*e* is protected from deflection deformation due to the weight of the lighting circuit unit 34. Should some deflection deformation nevertheless occur, the front end opening 12*a* is not significantly affected by the deformation, thus preventing failure of the seal between the lamp body 12 and the front lens 14.

Especially with this modified example, the top surface 12*ml* of the bottom wall extension portion 12*m* is formed in an arc-shape along the circumference of the bulb replacement opening 12*d*. This further enhances the rigidity of the bottom wall extension portion 12*m*.

Instead of forming the top surface 12*ml* of the bottom wall extension portion 12*m* in an arc-shape, the rigidity of the bottom wall extension portion 12*m* itself can be enhanced by forming it with a generally identical perpendicular cross section. In this case, formation of a plurality of reinforcement ribs 12*g* on the top surface 12*ml* of the bottom wall extension portion 12*m* as in the first embodiment enhances the rigidity of the lamp body 12 from the rear wall 12*c* to the bottom wall extension portion 12*m*.

It should further be apparent to those skilled in the art that various changes in form and detail of the invention as shown and described above may be made. It is intended that such changes be included within the spirit and scope of the claims appended hereto.

What is claimed is:

1. A vehicular headlamp comprising: a lamp body, a front lens mounted in an opening at a front end of said lamp body, a reflector housed in a lamp chamber defined by said lamp body and said front lens, a discharge bulb mounted on said reflector, a lighting circuit unit for igniting said discharge bulb installed on an outer surface of a bottom wall of said lamp body, a bulb replacement opening for replacing said discharge bulb being formed in a rear wall of said lamp body, and a cord insertion opening, through which passes a power feeding cord connecting said lighting circuit unit to said discharge bulb, being formed in said bottom wall of the lamp body, and a bottom wall extension portion extending rearward beyond said bulb replacement opening being formed at a rear end portion of said bottom wall of said lamp body.

2. The vehicular headlamp according to claim 1, further comprising a plurality of reinforcement ribs each extending rearward from said rear wall of said lamp body and formed on a top surface of said bottom wall extension portion.

3. The vehicular headlamp according to claim 1, wherein said bottom wall extension portion has a plate-like shape.

4. The vehicular headlamp according to claim 1, wherein said bottom wall extension portion is formed as a folded-back portion having a U-shape in perpendicular cross section.

5. The vehicular headlamp according to claim 1, further comprising a unit cover for covering said lighting circuit unit installed on said outer surface of said bottom wall of said lamp body, and a sealing portion for installing said unit cover on said bottom wall formed on a bottom surface of said bottom wall extension portion rearward of said lighting circuit unit.

6. The vehicular headlamp according to claim 5, wherein said sealing portion comprises a sealing groove formed on said bottom surface of said bottom wall extension portion, and a sealing material disposed in said groove.

7. The vehicular headlamp according to claim 6, wherein said unit cover comprises a sealing leg portion extending into said sealing groove, and a flange portion formed adjacent said sealing leg portion for controlling a depth of penetration of said sealing leg portion into said groove.

8. The vehicular headlamp according to claim 4, wherein a top surface of said bottom wall extension portion is formed in an arc extending along a portion of a circumference of said bulb replacement opening.

9. The vehicular headlamp according to claim 5, further comprising a coupling rib extending in a longitudinal direction between said sealing portion and a sealing groove joining said lens to said front end of said lamp body.

10. The vehicular headlamp according to claim 1, wherein said lighting circuit unit is installed on said outer surface of said bottom wall at a position crossing said rear wall in a longitudinal direction.

* * * * *